(12) United States Patent
Mogi (10) Patent No.: US 10,099,559 B2
(45) Date of Patent: Oct. 16, 2018

(54) VEHICLE CONTROL DEVICE OF FOUR-WHEEL INDEPENDENT DRIVE VEHICLE FOR WHEN ONE WHEEL IS LOST

(71) Applicant: NTN CORPORATION, Osaka-shi, Osaka (JP)

(72) Inventor: Katsutoshi Mogi, Iwata (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 15/208,140

(22) Filed: Jul. 12, 2016

(65) Prior Publication Data

US 2016/0318401 A1 Nov. 3, 2016

Related U.S. Application Data

(63) Continuation of application No. PCT/JP2015/050206, filed on Jan. 7, 2015.

(30) Foreign Application Priority Data

Jan. 15, 2014 (JP) .................................. 2014-004844
Dec. 18, 2014 (JP) .................................. 2014-256204

(51) Int. Cl.
*B60L 3/10* (2006.01)
*B60L 15/00* (2006.01)
(Continued)

(52) U.S. Cl.
CPC ............ *B60L 3/102* (2013.01); *B60K 7/0007* (2013.01); *B60K 17/356* (2013.01); *B60L 3/00* (2013.01);
(Continued)

(58) Field of Classification Search
CPC ............................... B60K 7/00; B60K 7/0007
See application file for complete search history.

(56) References Cited

U.S. PATENT DOCUMENTS

| 5,376,868 | A | 12/1994 | Toyoda et al. |
| 6,584,396 | B2 | 6/2003 | Wetzel et al. |

(Continued)

FOREIGN PATENT DOCUMENTS

| EP | 2003035 A2 | 12/2008 |
| JP | 8-168112 | 6/1996 |

(Continued)

OTHER PUBLICATIONS

Chinese Office Action dated Apr. 6, 2017 in corresponding Chinese Patent Application No. 201580004315.6.

(Continued)

*Primary Examiner* — Kimberly S Berona
*Assistant Examiner* — Anshul Sood (57) ABSTRACT

A target longitudinal force sum/yaw moment setting section is provided which is configured to determine and set a target longitudinal force sum to be exerted on drive wheels by drive sources and a target yaw moment of a vehicle. A failure detection section is provided which is configured to detect occurrence of a failure in the drive source of each of the drive wheels and a drive system including a control system of the drive source. A one-wheel-failure control section is provided which is configured to, when a failure of one of the wheels is detected by the failure detection section, drive the drive sources of all the remaining sound wheels so as to minimize a sum of squares of load factors of the sound wheels and to be matched with the target longitudinal force sum and the target yaw moment that are set.

6 Claims, 5 Drawing Sheets

(51) Int. Cl.
*B60L 3/00* (2006.01)
*B60L 15/20* (2006.01)
*B60W 50/029* (2012.01)
*B60K 7/00* (2006.01)
*B60K 17/356* (2006.01)
*B60L 3/12* (2006.01)

(52) U.S. Cl.
CPC .............. *B60L 3/12* (2013.01); *B60L 15/007* (2013.01); *B60L 15/20* (2013.01); *B60L 15/2036* (2013.01); *B60W 50/029* (2013.01); B60K 2007/0038 (2013.01); B60K 2007/0092 (2013.01); B60L 2210/40 (2013.01); B60L 2220/46 (2013.01); B60L 2240/22 (2013.01); B60L 2240/24 (2013.01); B60L 2240/32 (2013.01); B60L 2240/423 (2013.01); B60L 2240/465 (2013.01); B60L 2260/28 (2013.01); B60W 2300/18 (2013.01); B60W 2540/18 (2013.01); B60W 2720/40 (2013.01); Y02T 10/7258 (2013.01)

(56) References Cited

U.S. PATENT DOCUMENTS

| | | |
|---|---|---|
| 6,991,061 B2 | 1/2006 | Laurent |
| 8,301,353 B2 | 10/2012 | Ono et al. |
| 2002/0183914 A1 | 12/2002 | Wetzel et al. |
| 2004/0140147 A1 | 7/2004 | Laurent |
| 2008/0054718 A1* | 3/2008 | Nishino ................ B60T 8/1755 701/97 |
| 2009/0063002 A1 | 3/2009 | Ono et al. |

FOREIGN PATENT DOCUMENTS

| | | |
|---|---|---|
| JP | 2001-322557 | 11/2001 |
| JP | 2003-527996 | 9/2003 |
| JP | 2004-210263 | 7/2004 |
| JP | 2007-269294 | 10/2007 |
| JP | 4412476 | 11/2009 |
| WO | WO 01/70549 A1 | 9/2001 |

OTHER PUBLICATIONS

Kawakarni et al., "Redundancy Technology Involving Motor Malfunction in All Wheel Drive Vehicle", Transactions of the Japan Society of Mechanical Engineers, vol. 72, No. 719, The Japan Society of Mechanical Engineers, Jul. 25, 2006, pp. 2123 to 2129.

International Search Report dated Apr. 21, 2015 in corresponding International Application No. PCT/JP2015/050206.

International Preliminary Report on Patentability dated Jul. 28, 2016 in corresponding International Patent Application No. PCT/JP2015/050206.

Extended European Search Report dated Nov. 2, 2017 in corresponding European Patent Application No. 15737225.1.

Peng He et al.: "Future motion control to be realized by in-wheel motored electric vehicle," Industrial Electronics Society, 2005, IECON 2005, 31$^{st}$ Annual Conference of IEEE, IEEE, Piscataway, NJ, USA, Nov. 6, 2005, pp. 2626-2631, XP010876329.

* cited by examiner

YAW ANGULAR VELOCITIES, VEHICLE SPEEDS, AND
LONGITUDINAL FORCES OF WHEELS BEFORE AND
AFTER OCCURRENCE OF FAILURE
(WHEN CONTROL IS APPLIED)

a: LONGITUDINAL FORCE IS GENERATED
IN SOUND WHEEL BY CONTROL
b: FAILURE OCCURS IN RIGHT REAR WHEEL

VEHICLE CONTROL DEVICE OF FOUR-WHEEL INDEPENDENT DRIVE VEHICLE FOR WHEN ONE WHEEL IS LOST

CROSS REFERENCE TO THE RELATED APPLICATION

This application is a continuation application, under 35 U.S.C. § 111(a), of international application No. PCT/JP2015/050206, filed Jan. 7, 2015, which is based on and claims Convention priority to Japanese patent application No. 2014-004844, filed Jan. 15, 2014, and Japanese patent application No. 2014-256204, filed Dec. 18, 2014, the entire disclosure of which is herein incorporated by reference as a part of this application.

BACKGROUND OF THE INVENTION

Field of the Invention

The present invention relates to a one-wheel-failure vehicle control device for a four-wheel independent drive vehicle which device performs a vehicle motion control when one wheel of a four-wheel independent drive vehicle equipped with an in-wheel motor or the like has failed.

Description of Related Art

As a vehicle control method employed when one of the drive sources of a vehicle that independently drives left and right wheels has failed and can no longer generate a normal braking/driving force, the following manners have been proposed.

According to Patent Document 1, when one of the drive sources has become inoperable during turning in a front-wheel drive vehicle that independently drives left and right wheels, the driving force is controlled by the following methods to suppress behavior change of the vehicle, thereby improving a running stability of the vehicle.

a) When the drive source of the front wheel on an outer wheel side on turning has become inoperable, the driving force for the front wheel on an inner wheel side on turning located on the opposite side thereof is gradually reduced such that the driving force becomes zero after an elapse of a predetermined period of time.

b) When the drive source of the front wheel on the inner wheel side on turning has become inoperable, a supply of the driving force to the front wheel on the outer wheel side on turning located on the opposite side thereof is immediately stopped.

According to Patent Document 2, when the drive source of one wheel of a four-wheel independent drive vehicle has failed, the braking/driving force on a laterally opposite side of a failed wheel is approximated to the braking/driving force of the failed wheel. The degree of the approximation of the braking/driving force is changed in accordance with a state of failure in the following methods.

a) For a vehicle in which the front wheels have a positive kingpin offset, when one of the front wheels (turnable wheels) has failed, the degree of approximation of the braking/driving force is set to be higher than in the case where one of the rear wheels (non-turnable wheels) has failed.

b) For a vehicle in which the front wheels have a negative kingpin offset, when one of the front wheels (turnable wheels) has failed, the degree of approximation of the braking/driving force is set to be lower than that in the case where one of the rear wheels (non-turnable wheels) has failed.

c) The greater the difference in braking/driving force between the left and right wheels in the event of failure is, the higher the degree of the approximation of the braking/driving forces is set to be.

According to Non-Patent Document 1, when a motor for one wheel of an eight-wheel independent drive vehicle has failed, the following methods are taken in accordance with a failure mode.

a) When the motor is freed: a motor located on the laterally opposite side of a failed motor is freed.

b) When the motor is locked: a regenerative braking force is generated by the motor located on the laterally opposite side of the failed motor.

RELATED DOCUMENT

Patent Document

[Patent Document 1] JP Laid-open Patent Publication No. H08-168112
[Patent Document 2] JP Patent No. 4412476

Non-Patent Document

[Non-Patent Document 1] Kiyomoto KAWAKAMI et al, "Redundancy Technology Involving Motor Malfunction in All Wheel Drive Vehicle", Transactions of the Japan Society of Mechanical Engineers, vol. 72, no. 719 (2006), pages 2123 to 2129

With the control methods in which the braking/driving force on the laterally opposite side of the failed wheel is matched with the braking/driving force of the failed wheel as in the above-described conventional techniques, a turning performance and a speed of the vehicle before occurrence of a failure may drastically change by the failure of one wheel, and therefore, these methods are insufficient in terms of a vehicle stability. In addition, a feeling of discomfort due to the failure is provided to the driver.

SUMMARY OF THE INVENTION

The present invention solves the above-described problems, and provides a one-wheel-failure vehicle control device for the four-wheel independent drive vehicle that can maintain the vehicle speed and turning performance even when one wheel has failed, allows for continuing to drive with the same level of safety as that before occurrence of a failure and with the same feel as that when no failure occurs, and can prevent drive wheels from exceeding the grip limit to start sliding.

Hereinafter, in order to facilitate understanding of the present invention, the present invention will be described with reference to the reference numerals in embodiments for the sake of convenience.

A one-wheel-failure vehicle control device for a four-wheel independent drive vehicle according to the present invention includes drive sources 4 configured to independently drive respective four drive wheels 2, 3 serving as left and right front wheels and left and right rear wheels. The one-wheel-failure vehicle control device includes: a target longitudinal force sum/yaw moment setting section 25 configured to calculate and set a longitudinal force sum that is a present target sum of longitudinal forces to be exerted on drive wheels 2, 3 by the corresponding drive sources 4 and a present target yaw moment of the vehicle; a failure detection section 26 configured to detect an occurrence of a failure in the drive source 4 of each of the drive wheels 2, 3 and a failure in a drive system having a control system of the drive source 4; and a one-wheel-failure control section 27 configured to, when a failure of one of the wheels is detected by the failure detection section 26, drive the drive sources 4 of all sound wheels except for the one wheel in which the failure is detected, so as to minimize a sum of squares of load factors of all the sound wheels and to be matched with the target longitudinal force sum and the target yaw moment that are set by the target longitudinal force sum/yaw moment setting means.

According to this configuration, the target longitudinal force sum/yaw moment setting means 25 constantly calculates and sets, for example, during driving of the drive sources, a longitudinal force sum that is a present target sum of longitudinal forces to be exerted on each of the drive wheels 2, 3 by the corresponding drive sources 4 of the four wheels, and a present target yaw moment of the vehicle. These set longitudinal force sum and yaw moment are constantly updated to the present values during running. When a failure occurs in the drive system of any of the drive wheels 2, 3, an occurrence of the failure is detected by the failure detection section 26. When the failure of one of the wheels is detected by the failure detection section 26, the one-wheel-failure control section 27 outputs a drive command such as a torque command, in place of a section 23 configured to distribute the drive command to each of the drive wheels 2, 3 of the four wheels in accordance with a depressing amount of an accelerator or the like in a normal state. At this time, the one-wheel-failure control section 27 outputs the drive commands to the drive sources 4 of all sound wheels, so as to minimize the sum of the squares of the load factors of all the sound wheels except for the one wheel in which the failure is detected and so as to be matched with the target longitudinal force sum and the target yaw moment that are set by the target longitudinal force sum/yaw moment setting section.

In this manner, the target value for the sum of the longitudinal forces acing on the four-wheel independent drive vehicle is set. Even when the failure of one wheel has occurred and an unintended longitudinal force has been generated in the failed wheel, the drive sources of the remaining three wheels, which are sound wheels, are controlled to provide appropriate longitudinal forces to the sound wheels so as to follow the set target value of the longitudinal force sum. Accordingly, even when one wheel has failed, it is possible to maintain the vehicle speed before the occurrence of the failure. The target value is set in advance also for the yaw moment acting on the vehicle. After the failure occurs in one wheel, the drive sources of the remaining three wheels are controlled so as to follow the target value of the target yaw moment. Accordingly, even when one wheel has failed, it is possible to maintain the turning performance before the occurrence of the failure. At the time of driving the remaining three wheels, if the load factors of some of the drive wheels 2, 3 are excessively high, those drive wheels 2, 3 may exceed the limit of the road surface gripping force to start sliding. However, the longitudinal force of each wheel is determined so as to minimize the sum of the squares of the load factors of all sound wheels. Accordingly, it is possible to provide room for the gripping force, and maintain the road surface gripping force while performing driving for four wheels by three wheels, thereby making it possible to prevent occurrence of a slip. That is, even when one wheel has failed, it is possible to maintain the vehicle speed and the turning performance, continue to drive with the same level of safety as that before the occurrence of the failure and with the same feel as that when no failure has occurred, and prevent the drive wheels from exceeding the grip limit to start sliding.

According to the present invention, the target longitudinal force sum/yaw moment setting section 25 may obtain a steering angle input from a steering device 10 of the vehicle, and may set the target yaw moment by using a transfer function with respect to the steering angle input that is determined by using an equation of motion of the vehicle 1. If various types of information on the vehicle 1, such as a mass and dimensions of various parts, are known, when a steering angle input is determined, the target yaw moment can be set by using a transfer function with respect to the steering angle input that is determined by using an equation of motion of the vehicle 1. By using the transfer function that is determined by using the equation of motion in this manner, if the various types of information on the vehicle 1 are known, it is possible to appropriately set the target yaw moment by calculation from the steering angle input, in particular, without the need to add sensors or like components.

According to the present invention, a transfer characteristic of a yaw angular velocity with respect to a steering angle input obtained from a steering device 10 of the vehicle 1 may be set and the target longitudinal force sum/yaw moment setting section 25 may calculate and set the target yaw moment from the steering angle input by using the transfer characteristic. As the transfer characteristic, for example, the transfer characteristic of the yaw angular velocity with respect to the steering angle input that has been previously examined by actual running before delivery or sale of the vehicle 1 to the user, is set. In this case, even if various types of information on the vehicle 1 are unknown, it is possible to appropriately set the target yaw moment by calculation from the steering angle input.

According to the present invention, the one-wheel-failure control section 27 may estimate one of a longitudinal force, a lateral force, and a vertical force acting on each of the wheels 2, 3 by solving an equation of motion of the drive wheel 2, 3 or the vehicle 1, and may determine the load factor of the drive wheel 2, 3 by using a value obtained by the estimation. By using the equation of motion of the drive wheel 2, 3 or the vehicle 1, it is possible to determine the load factor by calculation, and a control for minimizing the sum of the squares of the load factors can be performed by using the load factor.

According to the present invention, the one-wheel-failure control section 27 may detect one of a longitudinal force, a lateral force, and a vertical force acting on each of the wheels 2, 3 with a load sensor 15 attached to a wheel supporting part 5, and may determine the load factor by using a value obtained by the detection. With use of a load sensor attached to a hub or the like, it is possible to detect the longitudinal force, the lateral force, the vertical force, and the like acting on each of the wheels 2, 3, so that it is possible to determine the load factor of each of the drive wheels 2, 3 without making calculation for solving the equation of motion, thereby making it possible to performing a control for minimizing the sum of the squares of the load factors by using the load factor.

In the case of estimating one of the longitudinal force, the lateral force, and the vertical force acting on each of the wheels 2, 3 by solving the equation of motion, and determining the load factor of each of the drive wheels 2, 3 by using the value obtained by the estimation as described above, the vertical force acting on each of the wheels 2, 3 may be estimated from a vehicle weight and distances between a center of gravity and front and rear axles. By making estimation using the vehicle weight and the distances between the center of gravity and the front and rear axles, it is possible to estimate the vertical force acting on each of the wheels easily and appropriately, thereby making it possible to easily perform the control for minimizing the sum of the squares of the load factors.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
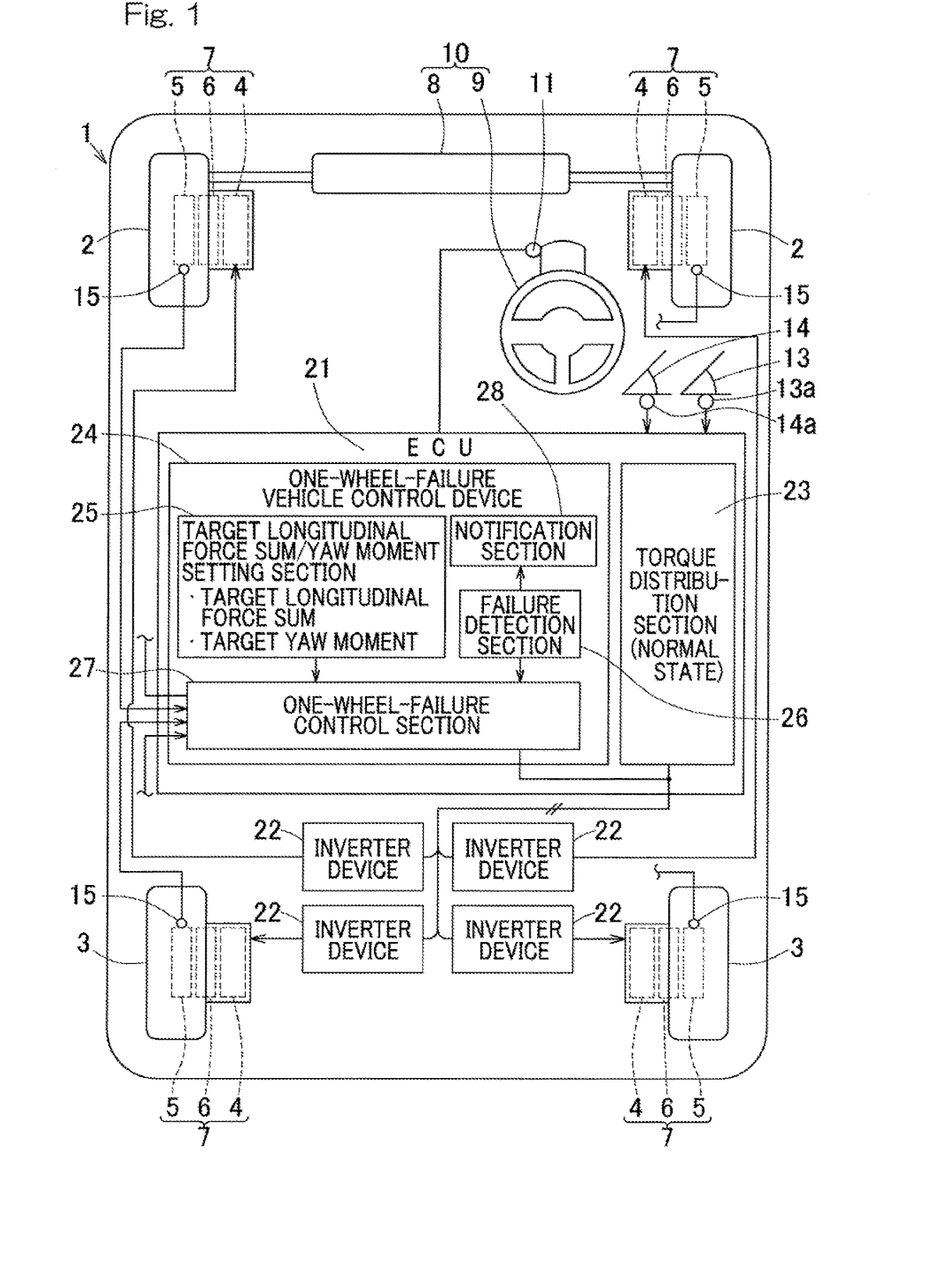
FIG. 1 is a block diagram showing a conceptual configuration of a one-wheel-failure vehicle control device for a four-wheel independent drive vehicle according to an embodiment of the present invention.

An embodiment of the present invention will be described with reference to the drawings. Referring to FIG. 1, a vehicle 1 to which a one-wheel-failure vehicle control device is applied is a four-wheel independent drive vehicle in which four drive wheels 2, 2, 3, 3 serving as left and right front wheels and left and right rear wheels are independently driven by respective motors 4 serving as drive sources. In the illustrated example, each motor 4 constitutes an in-wheel motor drive device 7, together with a wheel bearing 5 and a speed reducer or reduction gear 6 that transmits a rotation of the motor 4 to a rotating ring (not shown) of the wheel bearing 5. The motor 4 is not limited to a motor constituting the in-wheel motor drive device 7, and may be a motor that is installed on a chassis and drives the drive wheels 2, 3 via a drive shaft (not shown).

The left and right drive wheels 2, 2 serving as the front wheels can be turned by a turning mechanism 8, and are steered with a steering wheel 9 serving as a steering input component through the turning mechanism 8. The turning mechanism 8 and the steering wheel 9 constitute a steering device 10. The steering device 10 in this example employs a steer-by-wire system including a turning motor (not shown) in the turning mechanism 8. The steering device 10 detects a steering angle of the steering wheel 9 by use of a steering detection sensor 11, and controls a rotation angle of the turning motor with a steering control section (not shown) on the basis of the detected steering angle. The steering control section is provided as a part of the functions of an ECU 21, which will be described later, or as a dedicated ECU. The steering device 10 may employ not only the steer-by-wire system but also a power steering or a system that mechanically transmits a rotation of the steering wheel 9 to the turning mechanism 8.

The control system of the vehicle 1 is mainly composed of the ECU 21 and inverter devices 22, 22, 22, 22 that respectively drive the motors 4 for the drive wheels 2, 3. The ECU 21 is an electric control unit that performs cooperative control and central control of the entire vehicle, and is provided with a torque distribution section 23.

The torque distribution section 23 receives input of an accelerating command from an accelerator manipulation component such as an accelerator pedal 13 and a decelerating command from a brake manipulation component such as a brake pedal 14, and distributes a drive command corresponding to a difference between the accelerating command and the decelerating command to the motors 4, 4, 4, 4 for the respective drive wheels 2, 3. The accelerating command and the decelerating command are commands for manipulation amounts such as depressing amount of pedals provided for the accelerator pedal 13 and the brake pedal 14 respectively. Basically, the torque distribution section 23 equally divides and provides the drive command to the respective motors 4 for the four wheels, but may be configured to have the function for adjusting the values of left and right driving forces in accordance with a steering angle input from the steering wheel 9. The drive command is a torque command, for example.

The drive command that is distributed and outputted from the torque distribution section 23 is provided to the inverter device 22 for each wheel. Each inverter device 22 includes an inverter (not shown) that converts a direct-current power of a battery (not shown) into an alternating-current power for driving the corresponding motor 4, and a motor control circuitry (not shown) that controls the inverter. The motor control circuitry includes a microcomputer and a motor control program. The inverter device 22 controls the inverter in accordance with the provided drive command such as the torque command to control the power provided to the motor 4.

The one-wheel-failure vehicle control device 24 is provided in the ECU 21 or provided as a dedicated ECU separate from the ECU 21, in the vehicle having the above-described configuration. The one-wheel-failure vehicle control device 24 includes a target longitudinal force sum/yaw moment setting section 25, a failure detection section 26, a one-wheel-failure control section 27, and a notification section 28.

The target longitudinal force sum/yaw moment setting section 25 is configured to constantly calculate and set a longitudinal force sum that is a present target sum of longitudinal forces exerted on the drive wheels 2, 3 by the corresponding motors 4, and a present target yaw moment of the vehicle, for example, during driving of the motors 4. The failure detection section 26 is configured to detect an occurrence of a failure in the drive source 4 of any of the drive wheels 2, 3 and a failure in a drive system including the control system of that drive source 4. The one-wheel-failure control section 27 is configured to, when the failure of one wheel is detected by the failure detection section 26, distribute the drive command such as the torque command, in place of the distribution performed by the torque distribution section 23. The one-wheel-failure control section 27 provides the drive command to the motors 4 for driving all sound wheels, which will be described later, except for the one wheel in which the failure is detected, so as to be matched with the target longitudinal force sum and the target yaw moment set by the target longitudinal force sum/yaw moment setting section 25, and so as to minimize a sum of squares of load factors in all the sound wheels. The one-wheel-failure control section 27 does not function when two or more wheels have failed. The notification section 28 is configured to, when the failure is detected by the failure detection section 26, notify a driver of the drive wheel 2, 3 in which the failure has occurred and the type of the failure by displaying the failure drive wheel 2, 3 and the type of the failure on a monitor (not shown) in front of the driver's seat. In addition to this, the notification section 28 notifies the driver of the fact that, due to the occurrence of the failure in one wheel, the vehicle is running with the remaining three wheels, by displaying that fact on the monitor.

Specific examples of the failures detected by the failure detection section 26 include faults in the inverter of each inverter device 22 and the motor control circuitry controlling the inverter, problems in the motor control program, breakage of cables, and damages to the components (gears and bearings) of each in-wheel motor drive device 7, including a slight damage.

The one-wheel-failure control section 27 will be described in detail. First, a description of the principle applied thereto will be given. Based on the vehicle kinematic theory, a longitudinal force sum X and a yaw moment M that act on the vehicle, for example, when the right rear wheel has failed, are represented by the following formulas.

[Math. 1]

$$X = X_1 + X_2 + X_3 + X_{fail} \quad (1)$$

$$M = (Y_2 + Y_2)l_f - (Y_2 + Y_{fail})l_r - d_f(X_2 - X_2)/2 - d_r(X_2 - X_{fail})/2 \quad (2)$$

Figure 2:
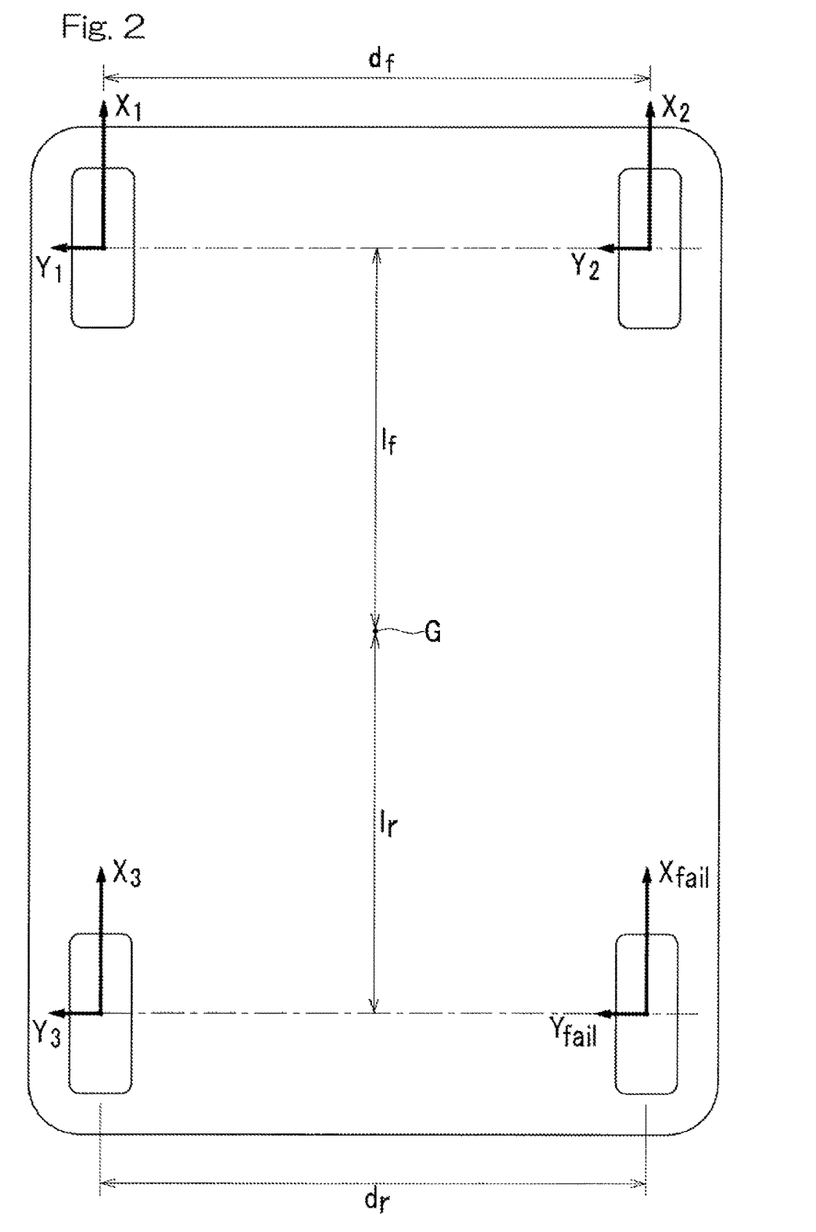
FIG. 2 is an explanatory diagram showing the dimensions and the working loads of various parts of the four-wheel independent drive vehicle in plan view.

In the formulas, Xi and Yi respectively represent the longitudinal force and a lateral force acting on each wheel. Regarding the subscript i, '1' represents the left front wheel, '2' represents the right front wheel, '3' represents the left rear wheel, and 'fail' represents the right rear wheel (the failed wheel) (see FIG. 2). lf and lr represent the distances from the vehicle's center of gravity G to front and rear axles respectively. df and dr represent the treads of the front and rear wheels respectively.

To decrease the load factors of the sound wheels after occurrence of the failure, which are represented by the following formula, the following evaluation function J is introduced. The load factor is defined as a ratio of a resultant force of the longitudinal force X and the lateral force Y relative to a vertical force Z described below. The evaluation function is the sum of the squares of the load factors of the sound wheels.

[Math. 2]

$$\text{Load factor}\left(=\sqrt{X_i^2 + Y_i^2}\Big/Z_i\right)J = \sum_{i=1}^{3}\left(\frac{\sqrt{X_i^2 + Y_i^2}}{Z_i}\right)^2 \quad (3)$$

In Formula (3), Zi represents a vertical force acting on each wheel. It is assumed that the longitudinal force sum X and the yaw moment M are given, and the longitudinal force Xi, the lateral force Yi, and the vertical force Zi that act on each wheel can be known. At this time, when a condition that the evaluation function (sum of squares of the load factors) of Formula (3) is minimized is added to Formulas (1) and (2), the longitudinal forces Xi (i=1 to 3) for the sound wheels are determined. That is, when the longitudinal force sum X and the yaw moment M before the occurrence of the failure are set as the target values, even if the failure occurs in the right rear wheel, it is possible to maintain the vehicle speed (corresponding to the longitudinal force sum) and the turning performance (corresponding to the yaw moment) before the occurrence of the failure so as to follow the target values, by providing, to the sound wheels, the longitudinal forces Xi determined by Formulas (1) to (3). The longitudinal forces provided to the sound wheels in this manner are determined such that the sum of the squares of the load factors of the sound wheels is minimized.

The one-wheel-failure control section 27 is configured to perform control according to the above-described principle, receives inputs of the longitudinal force Xi, the lateral force Yi, and the vertical force Zi acting on each wheel, and determines the longitudinal forces Xi for all sound wheels by using Formulas (1) and (2) so as to give the longitudinal force sum X and the yaw moment M set as the targets by the target longitudinal force sum/yaw moment setting section 25 and so as to minimize the evaluation function of Formula (3). The determined longitudinal force Xi for each wheel is provided to the inverter device 22 for the respective wheel.

In the one-wheel-failure control section 27, each of the longitudinal force Xi, the lateral force Yi, and the vertical force Zi may be estimated by using the equation of motion of wheels (drive wheels 2, 3). In the case where a load sensor 15 capable of measuring a load acting on a wheel is provided, these forces may be measured by using values detected by the load sensor 15. The load sensor 15 is provided, for example, to a wheel supporting part such as the wheel bearing 5 or a hub (not shown). One or more of the longitudinal force Xi, the lateral force Yi, and the vertical force Zi may be estimated by using the equation of motion, and the remaining forces may be measured by using the values detected by the load sensor 15. Instead of using the load sensor 15, the longitudinal force Xi, the lateral force Yi, and the vertical force Zi may be estimated by using an output from an attitude detection sensor (not shown) for detecting the attitude of the vehicle 1. For simplicity, assuming that a significant load shift does not occur in the longitudinal direction and the left-right direction, the vertical force Zi may be given by the following formulas in which a vehicle weight W is distributed on the basis of lf and lr.

[Math. 3]

$$Z_1 = Z_2 = \frac{l_r}{l_f + l_r}\frac{W}{3} \quad (4)$$

$$Z_3 = Z_{fail} = \frac{l_f}{l_f + l_r}\frac{W}{3}$$

The target longitudinal force sum/yaw moment setting section 25 will be described in detail. The target longitudinal force sum X is set in accordance with depressing amounts (manipulation amounts) of the accelerator pedal 13 and the brake pedal 14. The target yaw moment M is set in accordance with a vehicle speed V and a steering angle δ.

For example, the yaw moment M(s) is set by determining a transfer function (M(s)/δ(s)) with respect to the steering angle input δ(s) by using an equation of motion of the vehicle in the following manner. Alternatively, the transfer characteristic of the yaw angular velocity with respect to the steering angle is examined by actual running, and the examined transfer characteristic is set.

From the equation of motion of the vehicle for a two-wheel model, the transfer characteristic of the yaw angular velocity r(s) with respect to the steering angle input δ(s) can be represented by the following formula. In the following formula, I represents a yaw moment of inertia, n represents a steering gear ratio, ωn represents a natural frequency of the vehicle, and ζ represents a damping ratio. A represents a stability factor, l represents the distance between the front and rear axles, m represents the vehicle mass, and Kr represents the cornering power of the rear wheels.

$$\frac{r(s)}{\delta(s)} = \frac{G_\delta^r(0)}{n} \frac{1 + T_r s}{1 + \frac{2\zeta s}{\omega_n} + \frac{s^2}{\omega_n^2}} \qquad [\text{Math. 4}]$$

Therefore, the target yaw moment M(s) may be set as $$\frac{M(s)}{\delta(s)} = \left[ \frac{G_\delta^r(0)}{n} \frac{s + T_r s^2}{1 + \frac{2\zeta s}{\omega_n} + \frac{s^2}{\omega_n^2}} \right]$$

where $$G_\delta^r(0) = \frac{1}{1 + AV^2} \frac{V}{l}$$

$$T_r = \frac{mLV}{2lK_r}$$

Figure 3:
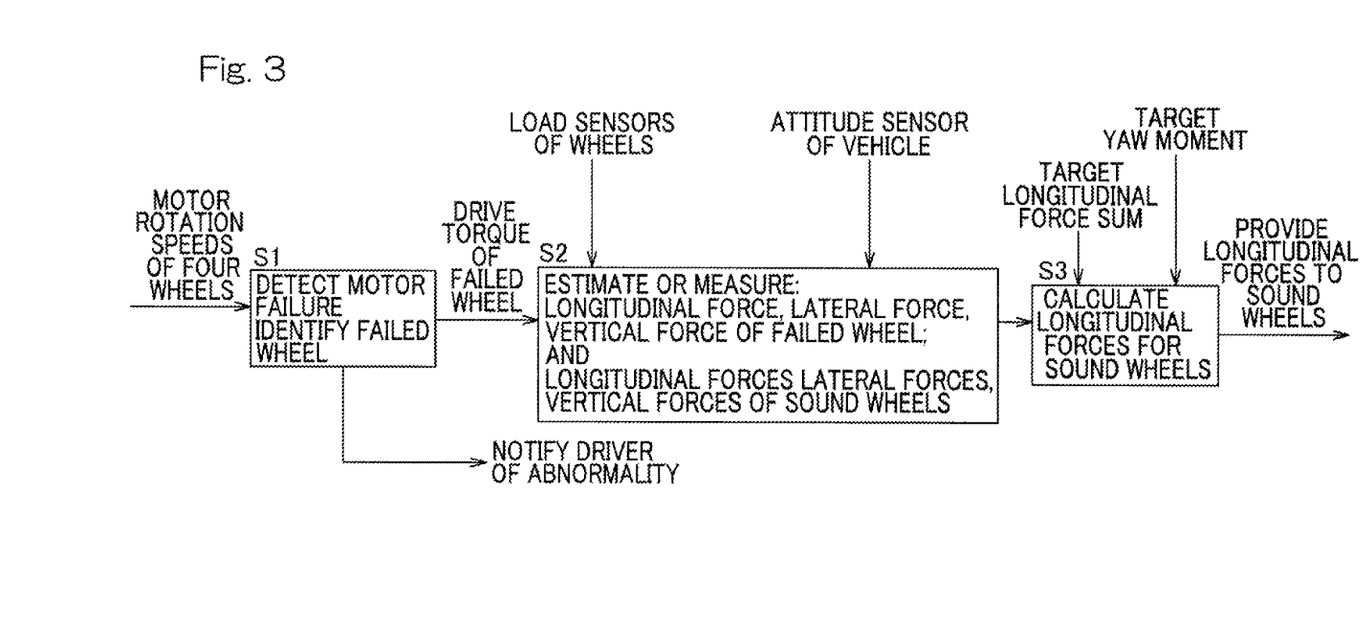
FIG. 3 is an explanatory diagram of a control operation performed by the one-wheel-failure vehicle control device.

An example of the control operation performed with the above-described configuration will be described in conjunction with FIG. 3. FIG. 3 shows a block diagram including the control according to the present embodiment when the failure has occurred. For example, the detected values of the rotational speed (or the number of rotation) of the motors 4 for the four wheels are constantly monitored to detect whether or not the motor failure has occurred, and to identify the failed wheel (step S1). The failure detection and the identification mentioned above are performed by the failure detection section 26 shown in FIG. 1. When a failure has occurred, the driver is notified of the abnormality by the notification section 28, and the drive torque of the failed wheel or the occurrence of the failure is informed from the failure detection section 26 to the one-wheel-failure control section 27.

The one-wheel-failure control section 27 obtains the longitudinal force Xi, the lateral force Yi and the vertical force Zi of the failed wheel, and the longitudinal forces Xi, the lateral forces Yi and the vertical forces Zi of the sound wheels either from the equation of motion or from the values measured by the load sensors 15 for the wheels or by the attitude sensor of the vehicle (step S2). After the longitudinal force Xi, the lateral force Yi, and the vertical force Zi of each wheel are obtained in this manner, the one-wheel-failure control section 27 calculates the longitudinal forces that are to be provided to all the sound wheels, so as to give the target longitudinal force sum and the target yaw moment set by the target longitudinal force sum/yaw moment setting section 25, and so as to minimize the sum of the squares of the load factors, that is, to minimize the value of the evaluation function (3) (step S3), and provides these calculated longitudinal forces to all the sound wheels as the drive commands for the motors 4, in place of the torque distribution section 23.

Figure 4:
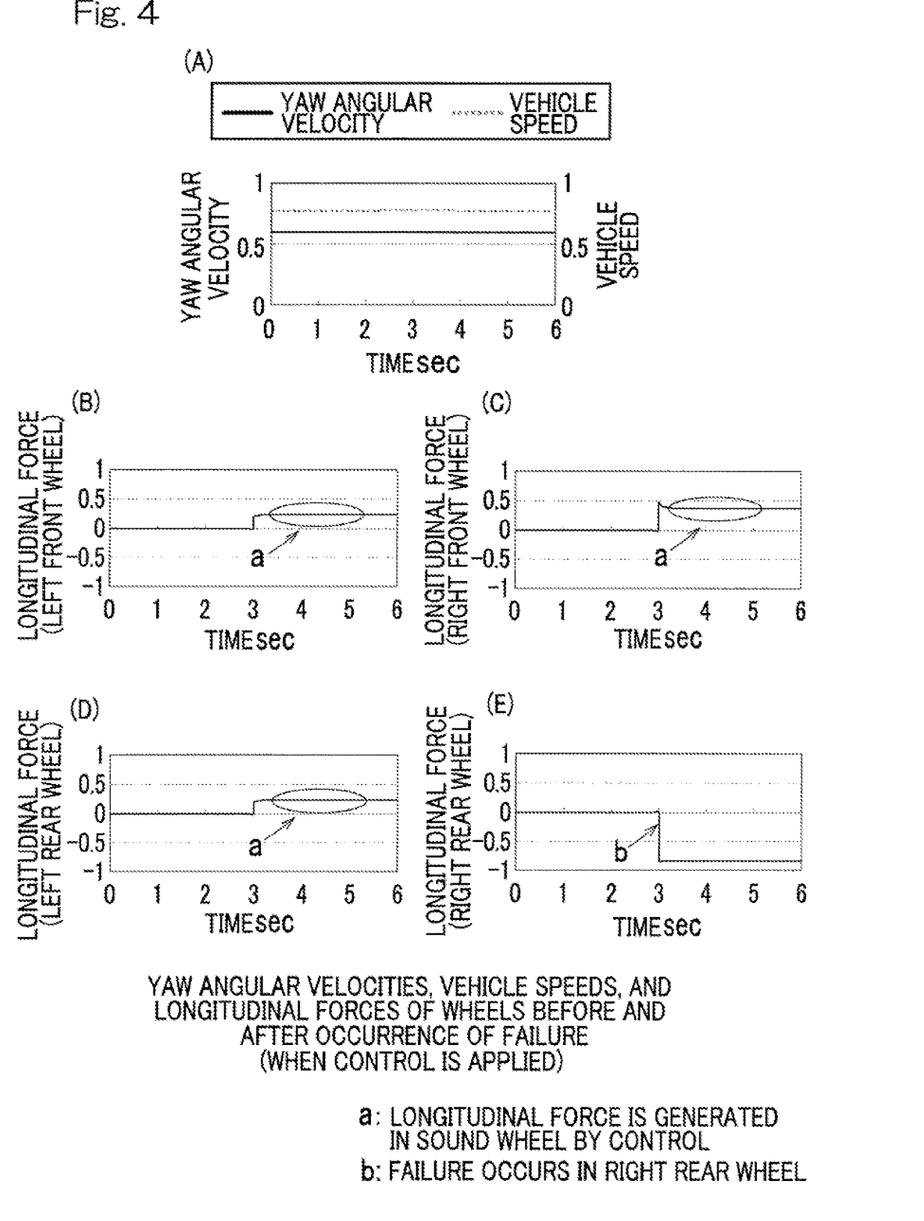
FIG. 4 shows graphs showing simulation results for a relationship between time, a yaw angular velocity, and a vehicle speed, and a relationship between time and a longitudinal force for each wheel when the one-wheel-failure vehicle control device is applied.
Figure 5:
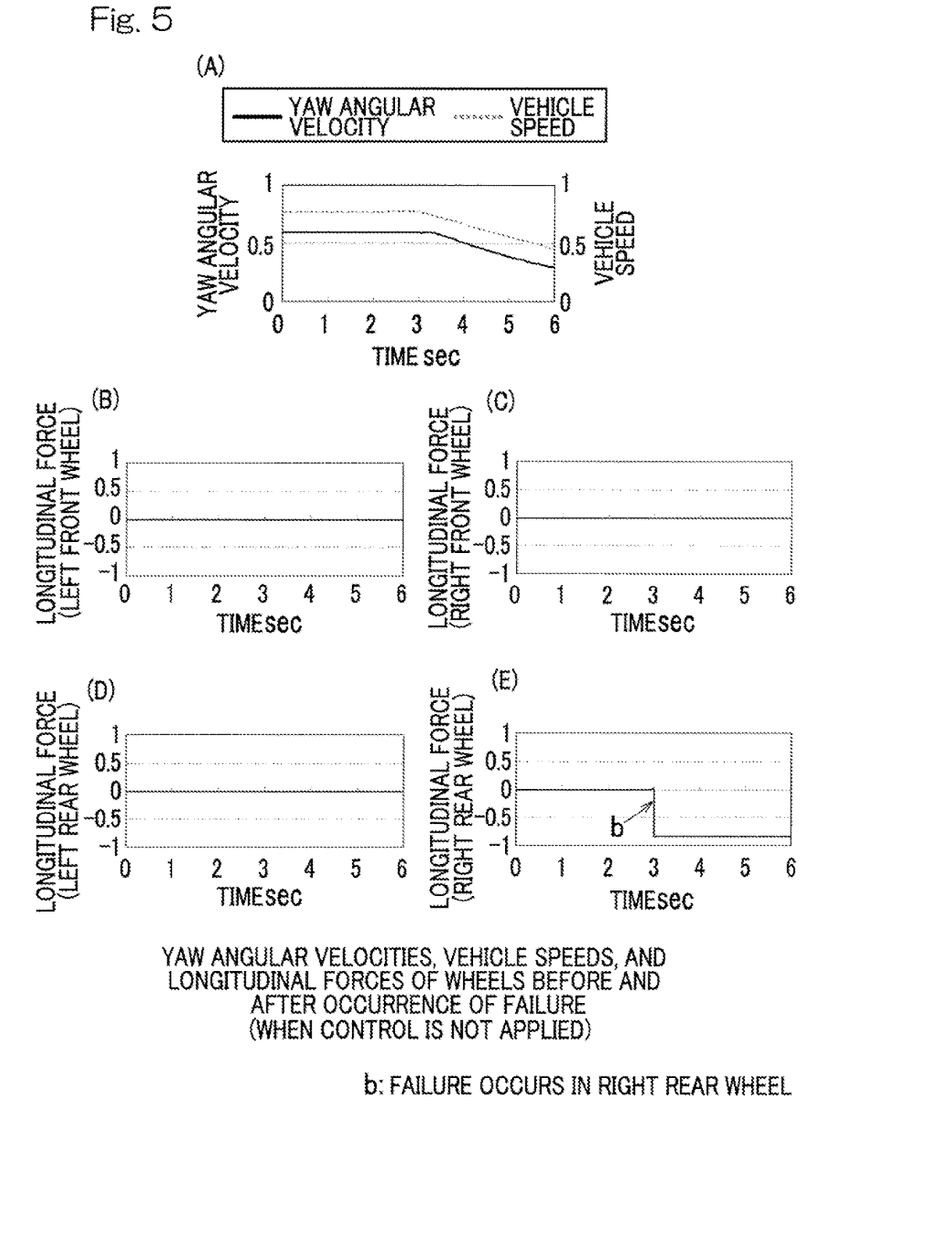
FIG. 5 shows graphs showing simulation results for a relationship between time, a yaw angular velocity, and a vehicle speed, and a relationship between time and a longitudinal force for each wheel when the one-wheel-failure vehicle control device is not applied.

The effects achieved by the control according to the present embodiment are verified by a simulation of the vehicle motion. The simulation assumes a situation where, during a circular turn in the counterclockwise direction at a speed of 50 km/h, a failure occurs in the right rear wheel so that a sudden braking force is unintendedly generated in the right rear wheel 3. To set values in the steady-state circular turn before the occurrence of the failure as the target values, X=M=0 is set. FIG. 5 shows the results obtained when the control according to the present embodiment is not applied. FIG. 4 shows the results obtained when the control according to the present embodiment is applied.

As can be seen from FIG. 5, when the control is not applied, the yaw angular velocity and the vehicle speed drop after the failure because of the sudden occurrence of braking of the right rear wheel. However, as shown in FIG. 4, it can be confirmed that, by providing appropriate longitudinal forces to the sound wheels through the control according to the present embodiment, it is possible to maintain the yaw angular velocity and the vehicle speed at their values before the occurrence of the failure, thereby allowing the circular turn to be continued without a feeling of discomfort. Although the foregoing description assumes that the right rear wheel has failed, the same control can also be applied regardless of which wheel has failed.

According to the one-wheel-failure vehicle control device 24 having this configuration, the target values for the longitudinal force sum and the yaw moment that act on a four-wheel independent drive vehicle are set as described above. Even when the motor for one wheel has failed and an unintended longitudinal force has been generated in the failed wheel, the motors for the remaining three wheels (sound wheels) are controlled to provide appropriate longitudinal forces to the sound wheels so as to follow the set target values. At this time, the longitudinal forces are determined so as to minimize the sum of the squares of the load factors of the sound wheels. Accordingly, even when one wheel has failed, it is possible to maintain the vehicle speed and the turning performance, thereby making it possible to continue to drive with the same level of safety as that before the occurrence of the failure. It is also possible to perform driving with the same feel as when the failure has not occurred. Furthermore, since the load factors of the wheels are taken into consideration in determination of the longitudinal forces, it is possible to prevent each wheel from exceeding a grip limit to start sliding.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included within the scope.

REFERENCE NUMERALS

1 . . . vehicle
2, 3 . . . drive wheel

4 . . . motor (drive source)
10 . . . steering device
15 . . . load sensor
25 . . . target longitudinal force sum/yaw moment setting section
26 . . . failure detection section
27 . . . one-wheel-failure control section

What is claimed is:

1. A one-wheel-failure vehicle control device for a four-wheel independent drive vehicle including drive sources configured to independently drive respective four drive wheels serving as left and right front wheels and left and right rear wheels, the one-wheel-failure vehicle control device comprising:
   a target longitudinal force sum/yaw moment setting section configured to calculate and set a longitudinal force sum that is a present target sum of longitudinal forces to be exerted on all four drive wheels by the corresponding drive sources and a present target yaw moment of the vehicle;
   a failure detection section configured to detect an occurrence of a failure in the drive source of each of the drive wheels and a failure in a drive system including a control system of the drive source; and
   a one-wheel-failure control section configured to, when a failure in the drive source and the drive system of one of the wheels is detected by the failure detection section, drive the drive sources of all sound wheels except for the one wheel in which the failure of the drive source and the drive system is detected,
   wherein the one-wheel-failure control section minimizes a sum of squares of load factors of all the sound wheels using the longitudinal force sum set by target longitudinal force sum/yaw moment setting section prior to the failure as a target value to determine the longitudinal force for each of the sound wheels, where the load factor is defined as a ratio of a resultant force of longitudinal force and lateral force relative to vertical force acting on the respective wheel.

2. The one-wheel-failure vehicle control device for the four-wheel independent drive vehicle as claimed in claim 1, wherein the target longitudinal force sum/yaw moment setting section obtains a steering angle input from a steering device of the vehicle, and sets the target yaw moment by using a transfer function with respect to the steering angle input that is determined by using an equation of motion of the vehicle.

3. The one-wheel-failure vehicle control device for the four-wheel independent drive vehicle as claimed in claim 1, wherein a transfer characteristic of a yaw angular velocity with respect to a steering angle input obtained from a steering device of the vehicle is set and the target longitudinal force sum/yaw moment setting section calculates and sets the target yaw moment from the steering angle input by using the transfer characteristic.

4. The one-wheel-failure vehicle control device for the four-wheel independent drive vehicle as claimed in claim 1, wherein the one-wheel-failure control section estimates one of a longitudinal force, a lateral force, and a vertical force acting on each of the wheels by solving an equation of motion of the drive wheel or the vehicle, and determines the load factor by using a value obtained by the estimation.

5. The one-wheel-failure vehicle control device for the four-wheel independent drive vehicle as claimed in claim 4, wherein the vertical force acting on each of the wheels is estimated from a vehicle weight and distances between a center of gravity and front and rear axles.

6. The one-wheel-failure vehicle control device for the four-wheel independent drive vehicle as claimed in claim 1, wherein the one-wheel-failure control section detects one of a longitudinal force, a lateral force, and a vertical force acting on each of the wheels with a load sensor attached to a wheel supporting part, and determines the load factor by using a value obtained by the detection.

\* \* \* \* \*